United States Patent

Kakiuchi et al.

[15] 3,685,767

[45] Aug. 22, 1972

[54] MAGNETIC TAPE TRANSPORTATION DEVICE FOR USE IN TAPE RECORDER USING MINIATURE CASSETTE

[72] Inventors: Tokusaburo Kakiuchi; Akira Ando; Hideaki Akiyama, all of Tokyo; Sei Jinsenji, Yokohama, all of Japan

[73] Assignee: Ricoh Co., Ltd., Tokyo, Japan

[22] Filed: Dec. 17, 1970

[21] Appl. No.: 98,992

[30] Foreign Application Priority Data

Dec. 18, 1969 Japan ....................44/101260

[52] U.S. Cl. ..................242/199, 226/168, 242/209, 274/4 C, 274/11 C

[51] Int. Cl. ..............................................G11b 15/32

[58] Field of Search.........226/91, 168, 180; 274/4 C, 274/11 C; 242/199, 200, 197, 55.19 A, 209

[56] References Cited

UNITED STATES PATENTS

| | | | |
|---|---|---|---|
| 2,499,895 | 3/1950 | Walker | 274/4 C |
| 3,111,282 | 11/1963 | Proctor | 242/200 |
| 3,528,626 | 9/1970 | Bumb | 242/197 X |
| 3,542,303 | 11/1970 | Auld | 242/197 X |

*Primary Examiner*—Richard A. Schacher
*Attorney*—Henry T. Burke, Robert Scobey, Robert S. Dunham, P. F. Henninger, Lester W. Clark, Gerald W. Griffin, Thomas F. Moran, Bradlee Boal and Christopher C. Dunham

[57] ABSTRACT

A magnetic tape drive or feed roller on the side of a tape recorder is inserted into a cassette for transporting the tape through the opening in the front wall of the cassette for receiving the cassette positioning pin. The tape may be transported at a constant speed by both of the drive roller and the take-up spool, so that no flutter and wow are produced, thus enabling the miniature tape recorder to be used in various fields.

3 Claims, 4 Drawing Figures

MAGNETIC TAPE TRANSPORTATION DEVICE FOR USE IN TAPE RECORDER USING MINIATURE CASSETTE

BACKGROUND OF THE INVENTION

The present invention relates to generally a tape recorder and more specifically a magnetic tape transporting device for transporting at a predetermined constant speed the magnetic tape in a miniaturized cassette loaded upon a tape recorder, thereby improving the sound quality.

In a small-sized or medium-sized tape recorder of the type using a cassette or cartridge holding therein magnetic tape, a capstan on the side of the tape recorder is inserted into the cassette through an opening formed in the cassette so as to press the magnetic tape against a pinch roller to transport the magnetic tape at a predetermined constant speed upon rotation of the capstan. In the conventional tape recorder of the type described, the variation in speed of transporting the magnetic tape is very small. However, in case of the recently developed tape recorder of the type using a miniature cassette for special purposes, the cassette has the flat top and bottom surfaces and is not provided with an opening through which a capstan is inserted, opposed to the conventional cassette or cartridge. In addition in order to miniaturize and simplify the tape transporting mechanism of the tape recorder, the take-up shaft on the side of the cassette is drivingly directly coupled to the take-up shaft on the side of the tape recorder, so that the speed of the magnetic tape passing over the head is varied depending upon the diameter of the tape wound around the take-up spool. Furthermore when the magnetic tape on the take-up spool is slacked, it is not transported across the magnetic heads until the slack is eliminated even when the take-up spool is rotated, so that the linear speed of the tape becomes almost zero. When the slack is eliminated, the tape is generally suddenly transported again. Thus flutter and wow are inevitably produced as the magnetic tape transportation speed is varied widely as described above, thus adversely affecting the recording and reproduction characteristics. The use of the tape recorder of the type described has been limited generally to recording.

SUMMARY OF THE INVENTION

One of the objects of the present invention is, therefore, to provide a novel and useful magnetic tape transportation device for use in the tape recorder of the type described, which device may transport the magnetic tape at a constant speed across the record-reproduce head without producing any flutter and wow.

Another object of the present invention is to provide a novel and useful magnetic tape transportation device of the type described which may be economically and simply incorporated in the tape recorder without any modification of the conventional miniature magnetic tape cassettes.

In brief, the present invention provides a novel and useful magnetic tape transportation device comprising a drive or feed roller disposed on the side of a tape recorder so as to be retractably inserted into a miniature magnetic tape cassette placed upon the tape recorder through one of the openings formed through the front wall of the cassette for receiving the cassette positioning pins on the side of the tape recorder. When the drive or feed roller is inserted into the cassette, it presses the magnetic tape against the guide pin in the cassette and transports it together with the take-up spool which is drivingly coupled to the take-up shaft of the tape recorder when the cassette is placed thereupon.

According to one aspect of the present invention, the magnetic tape may be transported across the record-reproduce head at a constant speed so that no flutter and wow are produced in recording and playback. The tape recorder incorporating the device of the present invention may be satisfactorily used for even recording and playing back the music.

According to another aspect of the present invention, the drive or feed roller may be inserted through the opening which is generally formed through the front wall of the miniature cassette for receiving therein the cassette positioning pin on the side of the tape recorder, so that the present invention may be advantageously used without providing a special opening in the cassette for insertion of the drive or feed roll.

The present invention will become more apparent from the following description of the preferred embodiment thereof taken in conjunction with the accompanying drawings.

DESCRIPTION OF THE PREFERRED EMBODIMENT

Figure 1:
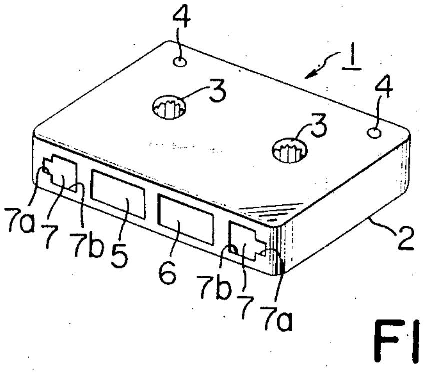
FIG. 1 is a perspective view of a miniature cassette used in the tape recorder shown in FIG. 1.
Figure 3:
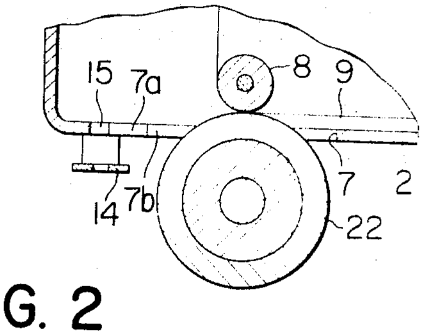
FIG. 3 is a fragmentary sectional view illustrating a magnetic tape transportation mechanism in accordance with the present invention.

Referring to FIG. 1, an extremely miniaturized cassette 1 to be referred to as "microcassette" for brevity will be described. The microcassette 1 consists of a cassette proper 2 whose undersurface is flat, a pair of spool shafts 3, a pair of guide holes 4 into which are fitted guide pins for positioning the microcassette 1, a recording opening 5 and an erase opening 6. Reference numeral 7 designates an opening in the form shown in FIG. 1 having a large-sized opening 7*a* and a small-sized opening 7*b* for receiving therein a movable positioning pin 15 (See FIG. 2). Within the microcassette 1 and between the upper and lower walls of the cassette proper 2 is interposed a stationary magnetic tape guide 8 in the form of a cylinder in opposed relation with the guide opening 7 so as to guide a magnetic tape 9.

Figure 2:
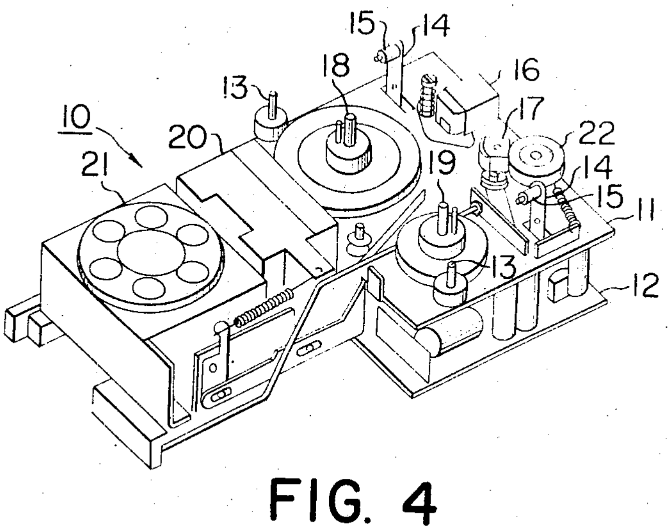
FIG. 2 is a perspective view illustrating the inside of a tape recorder incorporating the present invention.
Figure 4:
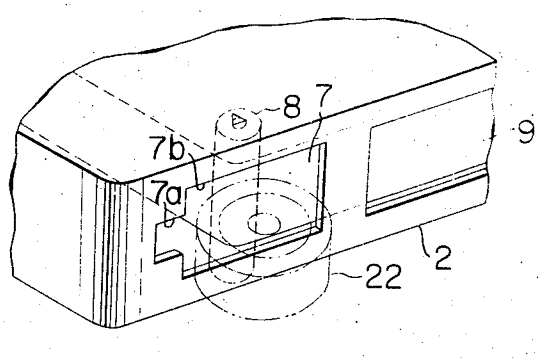
FIG. 4 is a fragmentary perspective view on enlarged scale illustrating the relation between the cassette and a feed roller on the side of the tape recorder.

FIG. 2 illustrates the inside of a tape recorder 10 using the microcassette 1 of the type described above. Reference numerals 11 and 12 designate an upper and low base plate respectively; 13, fixed positioning pins; 14, leaf springs the bases of which are securely fixed to the upper base plate 11 and which have the movable positioning pins 15 fixed to the free ends and extended at right angles relative to the stationary positioning pins 13 extending from the upper base plate 11; 16, a record-reproduce head; 17, an erase head; 18, a take-up shaft; 19, a pay-off shaft; 20, a driving motor; and 21, a loudspeaker. Both of the take-up and pay-off shafts 18 and 19 are coupled to the motor 20 for rotation through a friction coupling.

Between the erase head 17 and the movable positioning pin 15 is interposed a feed roller 22 which is rotated at a predetermined rotational speed by the motor 20, is moved into and out of the microcassette 1 through the opening 7 and has its periphery made of rubber.

The microcassette 1 may be loaded upon the tape recorder 10 in such a manner that the movable positioning pins 15 are fitted into the small-sized openings *7b* and then the top of the microcassette 1 is pushed toward the top base plate 11 of the tape recorder so as to fit the positioning holes 4 over the stationary positioning pins 13 while the leaf spring 14 supporting the positioning pins 15 are slightly moved backwardly. Thus the microcassette may be placed precisely in the predetermined position on the tape recorder 10. The take-up shaft 18 and the pay-off shaft 19 are drivingly coupled to the spool shafts 3 on the side of the microcassette 1; the record-reproduce head is moved into the microcassette 1 for contact with the tape 9; and the erase head 17 is also moved into the microcassette 1 through the opening 7 for contact with the tape 9. The feed roller 22 may now move into the microcassette 1 through the large-sized opening *7a* for pressing the tape 9 against the stationary guide pin 8. Upon rotation of the motor 20, the feed roller 22 is rotated while the take-up shaft 18 is also rotated so that the tape 9 may be transported at a predetermined constant speed. That is, the length of the tape 9 advanced by the feed roller 22 may be wound around the take-up spool. When the winding speed of the take-up shaft 18 is increased due to the increment of the tape winding, there occurs a motor slip on the part of shaft 18 so that the rotational speeds between the shaft 18 and the roller 22 are balanced.

From the foregoing description it is seen that the tape may be transported at a predetermined constant speed by a feed roller which may be moved into the microcassette through the opening formed through the front wall of the microcassette.

We claim:

1. In a magnetic tape recorder for use with a cassette including a housing having a front wall, a pay-off spool and an externally drivable take-up spool mounted within the housing, a magnetic recording tape wound on and extending between the spools within the housing, a first opening in the front wall for receiving a positioning pin, a second opening in the front wall for exposing the tape to a record-reproduce head, and means including a guide pin for guiding the tape successively past the first and second openings from the pay-off spool to the take-up spool, the guide pin being fixedly mounted in the housing in facing relation to the first opening such that the tape passes between the guide pin and the first opening, the combination comprising:

a. means for holding the cassette housing in a predetermined position, including a positioning pin insertable in the first opening;

b. a record-reproduce head disposed for register with said second opening when the housing in in said predetermined position;

c. a take-up shaft for coupling with and driving said take-up spool when the housing is in said predetermined position;

d. a drive roller, retractably insertable through the first opening when the housing is in said predetermined position, for pressing the tape against the guide pin to drive the tape forwardly from the pay-off spool upon rotation of the drive roller; and e. means for driving said take-up shaft and said drive roller.

2. A magnetic tape recorder system comprising:

a. a cassette housing having a front wall;

b. a pay-off spool mounted within the housing;

c. an externally drivable take-up spool mounted within the housing;

d. a magnetic recording tape wound on and extending between the spools within the housing;

e. said front wall having a first opening for receiving a positioning pin, and a second opening for exposing the tape to a record-reproduce head;

f. means including a guide pin for guiding the tape successively past the first and second openings from the pay-off spool to the take-up spool, the guide pin being fixedly mounted in the housing in facing relation to the first opening such that the tape passes between the guide pin and the first opening;

g. means for holding the cassette housing in a predetermined position, including a positioning pin inserted in the first opening;

h. a record-reproduce head disposed in register with said second opening;

i. a tape-driving motor;

j. a take-up shaft, having a slippable frictional coupling with said motor, coupled with said take-up spool for driving said take-up spool; and k. a drive roller, driven by said motor and retractably insertable through the first opening, for pressing the tape against the guide pin to drive the tape forwardly from the pay-off spool upon rotation of the drive roller by the motor.

3. A system as defined in claim 2, wherein said guide pin has a surface of convex curvature facing, and axially parallel to, said drive roller.

* * * * *